US012561904B2

(12) United States Patent (10) Patent No.: US 12,561,904 B2
Ogawa (45) Date of Patent: Feb. 24, 2026

(54) IMAGE PROCESSING DEVICE AND IMAGE PROCESSING METHOD FOR CORRECTING COMPUTER GRAPHICS IMAGE IN MIXED REALITY

(71) Applicant: CANON KABUSHIKI KAISHA, Tokyo (JP)

(72) Inventor: Masato Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 18/411,559

(22) Filed: Jan. 12, 2024

(65) Prior Publication Data

US 2024/0249470 A1 Jul. 25, 2024

(30) Foreign Application Priority Data

Jan. 25, 2023 (JP) ................................. 2023-009247

(51) Int. Cl.
| | |
|---|---|
| *G06T 17/00* | (2006.01) |
| *G06T 7/70* | (2017.01) |
| *G06T 11/60* | (2006.01) |
| *G06V 10/56* | (2022.01) |
| *G06V 10/60* | (2022.01) |
| *G06V 10/74* | (2022.01) |

(52) U.S. Cl.
CPC ................ *G06T 17/00* (2013.01); *G06T 7/70* (2017.01); *G06T 11/60* (2013.01); *G06V 10/56* (2022.01); *G06V 10/60* (2022.01); *G06V 10/761* (2022.01)

(58) Field of Classification Search
CPC ........... G06T 17/00; G06T 7/70; G06V 10/56; G06V 10/761; G06V 10/60
See application file for complete search history.

(56) References Cited

U.S. PATENT DOCUMENTS

| | | | |
|---|---|---|---|
| 10,825,249 B2 | 11/2020 | Jouet | |
| 2012/0008015 A1* | 1/2012 | Manabe ............... | H04N 23/741 348/E9.053 |
| 2012/0075484 A1 | 3/2012 | Kawamoto | |
| 2014/0212065 A1* | 7/2014 | Hirai .................... | H04N 23/815 382/284 |
| 2014/0267841 A1* | 9/2014 | Sasaki ................. | H04N 23/741 348/254 |

(Continued)

FOREIGN PATENT DOCUMENTS

| | | |
|---|---|---|
| JP | 2014-203326 A | 10/2014 |
| JP | 6082642 B2 | 2/2017 |
| JP | 2018-049614 A | 3/2018 |

*Primary Examiner* — Terrell M Robinson
(74) *Attorney, Agent, or Firm* — Venable LLP

(57) ABSTRACT

An image processing device includes an acquisition unit, an adjustment unit, a prediction unit, and a generation unit. The acquisition unit acquires a first parameter for adjusting the property of a captured image of a first frame, and a second parameter for adjusting the property of a captured image of a second frame. The adjustment unit adjusts the property of the captured image of the second frame based on the second parameter. The prediction unit predicts a third parameter for matching the property of the captured image of the second frame adjusted by the adjustment unit and the property of a virtual object based on a delay time and the first parameter. The generation unit generates the virtual object whose property is adjusted based on the third parameter.

18 Claims, 13 Drawing Sheets

(56) References Cited

U.S. PATENT DOCUMENTS

| | | | |
|---|---|---|---|
| 2016/0275913 A1* | 9/2016 | Nagashima | ............. G09G 3/20 |
| 2018/0075660 A1 | 3/2018 | Jouet | |
| 2021/0327101 A1 | 10/2021 | Ikeda | |
| 2022/0377228 A1* | 11/2022 | Lim | ...................... H04N 23/72 |

* cited by examiner

| FRAME | CAPTURED IMAGE | | CG | | |
|---|---|---|---|---|---|
| | BRIGHTNESS | EXPLANATION | BRIGHTNESS | STACK | |
| 0~2 | +5 | APPROPRIATE EXPOSURE | +5 | | APPROPRIATE EXPOSURE |
| 3 | -5 | LIGHT DARKENS | +5 | | APPROPRIATE EXPOSURE |
| 4 | -3 | CALCULATE PARAMETER FOR RESETTING TO APPROPRIATE EXPOSURE (FOR APPLYING [+2] TO 5 FRAMES) APPLY PARAMETER | +5 | | APPROPRIATE EXPOSURE |
| 5 | -1 | APPLY PARAMETER | -5 | | MATCH BRIGHTNESS WITH REALITY VIDEO OF FRAME 3 |
| 6 | +1 | APPLY PARAMETER | +1 | [+2] [+2] | PREDICT FUTURE CHANGE OF BRIGHTNESS FROM BRIGHTNESS OF CAPTURED IMAGE OF FRAME 4, AND PARAMETER FOR RESETTING TO APPROPRIATE EXPOSURE |
| 7 | +3 | APPLY PARAMETER | +3 | [+2] | APPLY PARAMETER ACCORDING TO PREDICTION |
| 8 | +5 | APPLY PARAMETER | +5 | | APPLY PARAMETER ACCORDING TO PREDICTION |

FIG. 5A

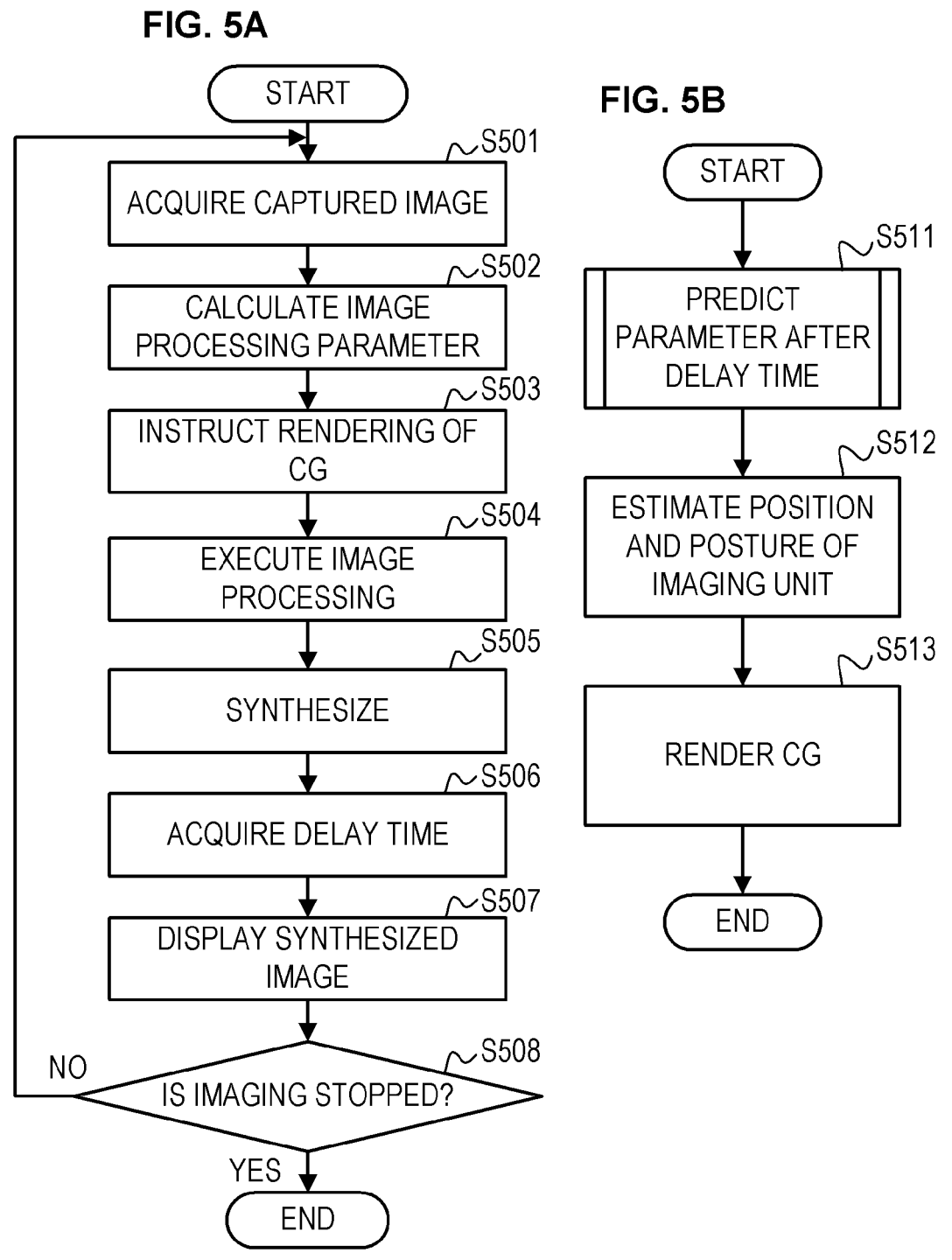

START

ACQUIRE CAPTURED IMAGE    ~S501

CALCULATE IMAGE PROCESSING PARAMETER    ~S502

INSTRUCT RENDERING OF CG    ~S503

EXECUTE IMAGE PROCESSING    ~S504

SYNTHESIZE    ~S505

ACQUIRE DELAY TIME    ~S506

DISPLAY SYNTHESIZED IMAGE    ~S507

IS IMAGING STOPPED?    ~S508

NO

YES

END

FIG. 5B

START

PREDICT PARAMETER AFTER DELAY TIME    ~S511

ESTIMATE POSITION AND POSTURE OF IMAGING UNIT    ~S512

RENDER CG    ~S513

END

| FRAME | CAPTURED IMAGE | | CG | | |
|---|---|---|---|---|---|
| | BRIGHTNESS | STACK | EXPLANATION | BRIGHTNESS | |
| 0~2 | +5 | [0] [0] | APPROPRIATE EXPOSURE | +5 | APPROPRIATE EXPOSURE |
| 3 | -5 | [0] [0] | LIGHT DARKENS | +5 | APPROPRIATE EXPOSURE |
| 4 | -5 | [0] [+2] | CALCULATE PARAMETER FOR RESETTING TO APPROPRIATE EXPOSURE (FOR APPLYING [+2] TO 5 FRAMES) STACK PARAMETERS | +5 | APPROPRIATE EXPOSURE |
| 5 | -5 | [+2] [+2] | STACK PARAMETERS | -5 | MATCH BRIGHTNESS WITH CAPTURED IMAGE OF FRAME 3 |
| 6 | -3 | [+2] [+2] | STACK PARAMETERS APPLY PARAMETER OF STACK LOWERMOST LAYER | -3 | PREDICT BRIGHTNESS FROM BRIGHT OF CAPTURED IMAGE OF FRAME 4 AND STACKED PARAMETERS |
| 7 | -1 | [+2] [+2] | STACK PARAMETERS APPLY PARAMETER OF STACK LOWERMOST LAYER | -1 | PREDICT BRIGHTNESS FROM BRIGHT OF CAPTURED IMAGE OF FRAME 5 AND STACKED PARAMETERS |
| 8 | +1 | [+2] [+2] | STACK PARAMETERS APPLY PARAMETER OF STACK LOWERMOST LAYER | +1 | PREDICT BRIGHTNESS FROM BRIGHT OF CAPTURED IMAGE OF FRAME 6 AND STACKED PARAMETERS |

FIG. 10B

| FRAME | CAPTURED IMAGE | | CG | | |
|---|---|---|---|---|---|
| | COLOR TEMPERATURE | STACK | EXPLANATION | COLOR TEMPERATURE | |
| 0~2 | 5000 | [0]<br>[0] | APPROPRIATE WB | 5000 | APPROPRIATE WB |
| 3 | 1000 | [0]<br>[0] | LIGHT BECOMES REDDISH | 5000 | APPROPRIATE WB |
| 4 | 1000 | [0]<br>[+800] | CALCULATE PARAMETER FOR RESETTING TO APPROPRIATE WB (FOR APPLYING [+800] TO 5 FRAMES) STACK PARAMETERS | 5000 | APPROPRIATE WB |
| 5 | 1000 | [+800]<br>[+800] | STACK PARAMETERS | 1000 | MATCH BRIGHTNESS WITH CAPTURED IMAGE OF FRAME 3 |
| 6 | 1800 | [+800]<br>[+800] | STACK PARAMETERS APPLY PARAMETER OF STACK LOWERMOST LAYER | 1800 | PREDICT BRIGHTNESS FROM COLOR TEMPERATURE OF CAPTURED IMAGE OF FRAME 4 AND STACKED PARAMETERS |
| 7 | 2600 | [+800]<br>[+800] | STACK PARAMETERS APPLY PARAMETER OF STACK LOWERMOST LAYER | 2600 | PREDICT BRIGHTNESS FROM COLOR TEMPERATURE OF CAPTURED IMAGE OF FRAME 5 AND STACKED PARAMETERS |
| 8 | 3400 | [+800]<br>[+800] | STACK PARAMETERS APPLY PARAMETER OF STACK LOWERMOST LAYER | 3400 | PREDICT BRIGHTNESS FROM COLOR TEMPERATURE OF CAPTURED IMAGE OF FRAME 6 AND STACKED PARAMETERS |

IMAGE PROCESSING DEVICE AND IMAGE PROCESSING METHOD FOR CORRECTING COMPUTER GRAPHICS IMAGE IN MIXED REALITY

BACKGROUND OF THE INVENTION

Field of the Invention

The present invention relates to an image processing device and an image processing method.

Description of the Related Art

In recent years, Mixed Reality (MR) for a purpose of seamlessly integrating a reality space and a virtual space has been studied. As one of these techniques, there is known a technique which uses a Head Mount Display (HMD) of a video see-through system.

This technique superimposes a Computer Graphics (CG) image generated according to a position and posture of an imaging device on an image (a reality space image) captured by the imaging device such as a video camera by capturing the reality space, and thereby generates a synthesized image. A user can observe the synthesized image through a display device such as a display of the HMD.

When the reality space image and CG (virtual object) are synthesized as is, the HMD of the video see-through system frequently displays the synthesized image which gives a sense of strangeness to the user. This is because the image property such as gradation, a white balance, noise, or a resolution differs between the reality space image and the CG.

For this problem, Japanese Patent No. 6082642 and Japanese Patent Application Publication No. 2018-49614 propose techniques of reducing the sense of difference given to users. These techniques perform processing of correcting CG to match a reality space image such that the image properties of the CG and reality space images are close. By, for example, correcting the CG using a parameter of the reality space image associated with an exposure correction value or a white balance adjustment value, it is possible to match the image property of the CG with the image property of the reality space image.

On the other hand, CG rendering (generation) requires a more processing time for adjustment of a position and posture of the CG or the like. Therefore, a timing at which a captured image to which the parameter has been applied can be displayed, and a timing at which the CG to which the same parameter has been applied can be displayed become different. Accordingly, there has been a probability that, when the captured image and the CG are displayed (synthesized) at a timing at which application of the respective parameters is finished, the CG arranged in the reality space gives a sense of strangeness to the user.

SUMMARY OF THE INVENTION

The present invention implements a technique of further reducing a sense of strangeness given by CG to a user.

An aspect of the present invention is an image processing device including at least one memory and at least one processor which function as: an acquisition unit configured to (1) acquire a first parameter for adjusting a property of a captured image of a first frame upon acquiring the captured image of the first frame acquired by an imaging unit, and (2) acquire a second parameter for adjusting a property of a captured image of a second frame upon acquiring the captured image of the second frame after the first frame; an adjustment unit configured to adjust the property of the captured image of the second frame based on the second parameter; a prediction unit configured to predict a third parameter for matching the property of the captured image of the second frame adjusted by the adjustment unit and a property of a virtual object based on a delay time which is a difference of a time between the first frame and the second frame, and the first parameter; and a generation unit configured to generate the virtual object whose property is adjusted based on the third parameter.

An aspect of the present invention is an image processing device including at least one memory and at least one processor which function as: an acquisition unit configured to acquire an image processing parameter based on a captured image of a first frame acquired by an imaging unit; a generation unit configured to generate a virtual object whose property is adjusted based on the image processing parameter; and an adjustment unit configured to adjust a property of a captured image of a second frame which is a frame after the first frame based on the image processing parameter.

An aspect of the present invention is an image processing method including: (1) acquiring a first parameter for adjusting a property of a captured image of a first frame upon acquiring the captured image of the first frame acquired by an imaging unit, and (2) acquiring a second parameter for adjusting a property of a captured image of a second frame upon acquiring the captured image of the second frame after the first frame; adjusting the property of the captured image of the second frame based on the second parameter; predicting a third parameter for matching the property of the captured image of the second frame adjusted by the adjusting and a property of a virtual object based on a delay time which is a difference of a time between the first frame and the second frame, and the first parameter; and generating the virtual object whose property is adjusted based on the third parameter.

An aspect of the present invention is an image processing method including: acquiring an image processing parameter based on a captured image of a first frame acquired by an imaging unit; generating a virtual object whose property is adjusted based on the image processing parameter; and adjusting a property of a captured image of a second frame which is a frame after the first frame based on the image processing parameter.

Further features of the present invention will become apparent from the following description of exemplary embodiments with reference to the attached drawings.

BRIEF DESCRIPTION OF THE DRAWINGS

FIGS. 4A and 4B are views for describing control of brightness according to embodiment 1;

FIGS. 5A and 5B are flowcharts of mixed reality video generation processing according to embodiment 1;

FIG. 6 is a flowchart illustrating image processing parameter prediction processing according to embodiment 1;

FIG. 8B is a view for describing control of brightness according to embodiment 2;

FIG. 10B is a view for describing control of a color temperature according to embodiment 3.

DESCRIPTION OF THE EMBODIMENTS

Hereinafter, embodiments of the present invention will be described in detail with reference to the accompanying drawings.

Embodiment 1

Figure 1:
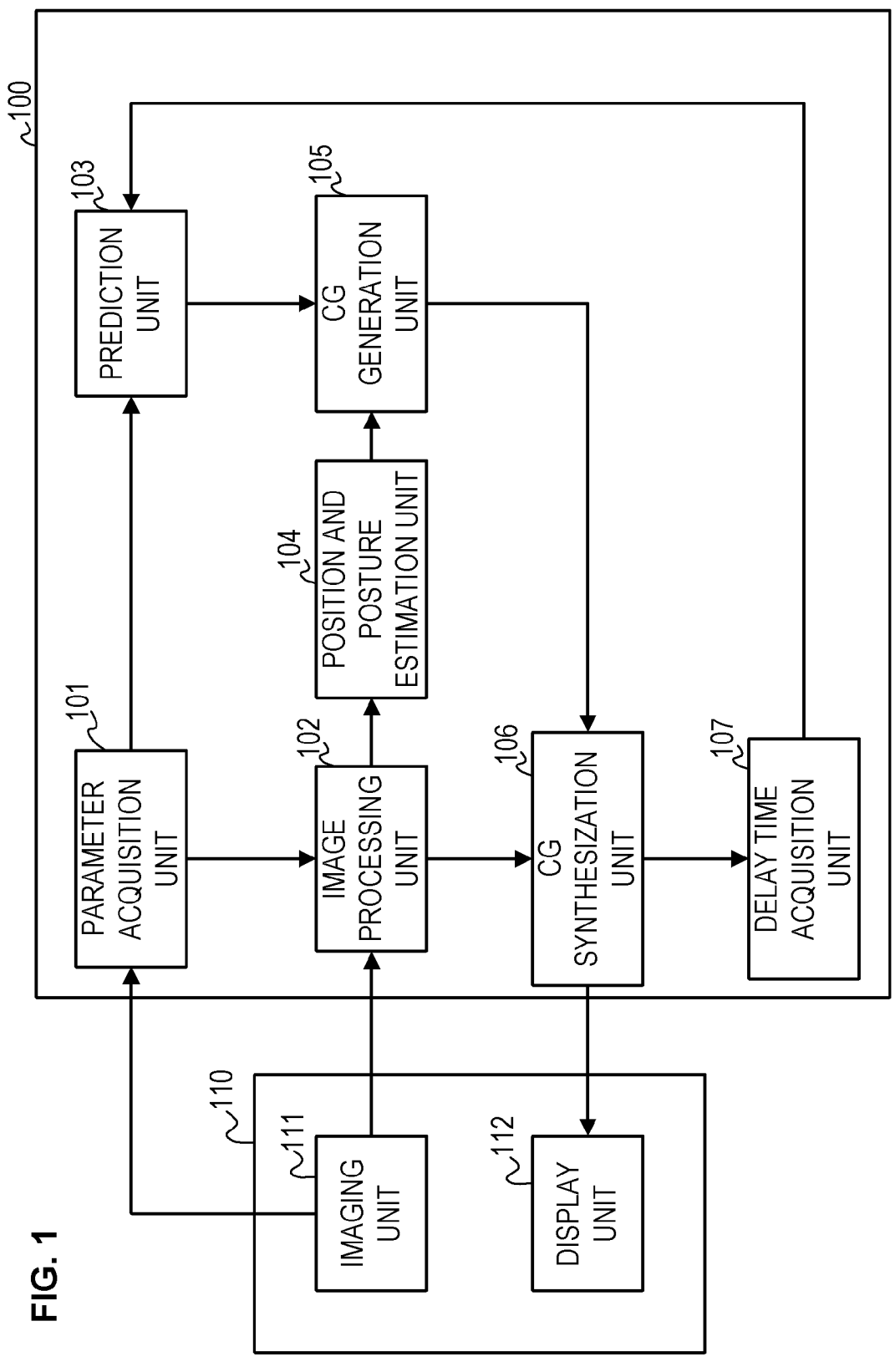
FIG. 1 is a functional configuration diagram of a system according to embodiment 1.

FIG. 1 is a block diagram illustrating a functional configuration example of a system according to embodiment 1. In the system according to embodiment 1, an image processing device 100 and an HMD 110 are connected. However, the HMD 110 may include all or part of components of the image processing device 100.

The HMD 110 includes an imaging unit 111 and a display unit 112. The image processing device 100 includes a parameter acquisition unit 101, an image processing unit 102, a prediction unit 103, a position and posture estimation unit 104, a CG generation unit 105, a CG synthesization unit 106, and a delay time acquisition unit 107.

The imaging unit 111 images a reality space, and acquires a video (reality video). The reality video includes a captured image of each frame during an imaging time. The imaging unit 111 transmits a video (the captured image of each frame) to the image processing device 100 by wire or wirelessly.

The display unit 112 displays a mixed reality video (a video obtained by synthesizing the reality video and CG) output from the CG synthesization unit 106.

The parameter acquisition unit 101 acquires an image processing parameter to be applied to the captured image of each frame based on the reality video (the captured image of each frame) acquired by the imaging unit 111. The image processing parameter is a parameter (a parameter of brightness) related to exposure of the imaging unit 111 (a gain, a shutter speed, and the like), or a parameter (R/G, B/G, and the like) related to a white balance of the imaging unit 111.

Embodiment 1 will be described citing the parameter related to exposure (the gain and the shutter speed) as an example of the image processing parameter. The parameter acquisition unit 101 first evaluates brightness of a captured image captured by the imaging unit 111 to correct to a captured image of appropriate exposure of the imaging unit 111. The parameter acquisition unit 101 calculates an image processing parameter for darkening an image (a parameter for decreasing the gain or increasing the shutter speed) when the captured image is excessively bright. When the captured image is excessively dark, the parameter acquisition unit 101 calculates the image processing parameter for brightening the image.

The image processing unit 102 applies the image processing parameter to the captured image. That is, in embodiment 1, the image processing unit 102 adjusts the brightness of the captured image based on the image processing parameter. The image processing unit 102 sends to the position and posture estimation unit 104 the captured image to which the image processing parameter has been applied. Note that, when a result of this image processing is input to the parameter acquisition unit 101, and the image processing unit 102 repeats calculation, it is also possible to appropriately adjust the brightness of the captured image at all times.

The prediction unit 103 predicts (estimates) an image processing parameter which needs to be applied to CG (virtual object). The prediction unit 103 predicts (estimates) the image processing parameter which needs to be applied to CG based on the brightness of the captured image, a delay time acquired by the delay time acquisition unit 107, and the image processing parameter acquired by the parameter acquisition unit 101.

The position and posture estimation unit 104 estimates a position and posture of the HMD 110 (imaging unit 111) based on the captured image showing a marker. Note that a method for estimating the position and posture is variously studied, and any method may be used. Furthermore, the position and posture estimation unit 104 may use a magnetic sensor, an optical sensor, or the like in combination to increase accuracy of information of the position and posture. The position and posture estimation unit 104 transmits the information of the position and posture of the HMD 110 to the CG generation unit 105.

The CG generation unit 105 acquires CG data from an external storage device 207 and the like. The CG generation unit 105 performs processing such as movement, rotation, or enlargement/reduction on the CG data. The CG generation unit 105 renders the CG which is superimposed on the marker in the captured image and is seen from the HMD 110. Note that, at a time of processing in the CG generation unit 105, the information of the position and posture acquired from the position and posture estimation unit 104 and, in addition, a principal point, focal distance information, and the like of the imaging unit 111 stored in advance in the external storage device 207 and the like are used. Furthermore, the CG generation unit 105 generates CG used for synthesization by applying to the CG the image processing parameter predicted by the prediction unit 103. The generated CG are transmitted to the CG synthesization unit 106.

The CG synthesization unit 106 superimposes the CG transmitted from the CG generation unit 105 on the captured image (the captured image to which the image processing parameter has been applied by the image processing unit 102). The CG synthesization unit 106 generates a mixed reality video by performing this processing on the captured image of each frame. Hereinafter, an image of one frame of the mixed reality video will be referred to as a "synthesized image".

The CG synthesization unit 106 transmits the mixed reality video to the display unit 112. Furthermore, the CG synthesization unit 106 can simultaneously transmit the mixed reality video to the HMD 110, and transmit the mixed reality video to an external image display device. That is, the mixed reality video can be also shared by multiple people.

Note that computation loads of processing in the position and posture estimation unit 104 and the CG generation unit 105 are large, and a long time is required until the processing is finished. Hence, when the same image processing parameter is applied to the captured image and the CG (the CG based on the captured image), a long time is required until processing in the CG synthesization unit 106 which uses the CG starts. Hence, generally, the captured image has been used for synthesization without waiting for generation of CG, and therefore a captured image and past CG to which respectively different image processing parameters have been applied have been synthesized. As a result, a mixed reality video which gives a sense of strangeness to users has been generated.

Note that the prediction unit 103 predicts (acquires) the image processing parameter which needs to be applied to CG to match brightness (properties) of the CG and the captured image. Here, the prediction unit 103 predicts the image processing parameter based on the brightness of the captured image, the image processing parameter calculated by the parameter acquisition unit 101, and the delay time. The delay time is a difference between a captured image processing (display; synthesization) timing and a CG processing timing. Here, the predicted image processing parameter is applied to the CG, so that the CG synthesization unit 106 can generate a synthesized image of the matched image properties (brightness) of the captured image and the CG.

The delay time acquisition unit 107 measures the delay time between the captured image and the CG. The delay time is, for example, a time taken until synthesization is performed using CG based on a captured image after synthesization is performed using the captured image. Alternatively, the delay time is a time taken until synthesization is performed using CG based on an image processing parameter after the image processing parameter based on a captured image is acquired.

For example, it is possible to use a method for comparing a time stamp indicating an image processing parameter acquisition time of the parameter acquisition unit 101 and a time stamp indicating a CG synthesization time of the CG synthesization unit 106, and acquiring a difference between the time stamps as a delay time.

Note that, in embodiment 1, delay occurs between the reality video (captured image) and the CG, and therefore when the CG synthesization unit 106 synthesizes the reality video (captured image) and the CG, mismatch may occur not only in the image processing parameter but also in the position and posture of the CG. Hence, after estimating the position and posture of the HMD 110 at a time of acquisition of a captured image of a certain frame based on the captured image of the certain frame, the position and posture estimation unit 104 predicts the position and posture of the HMD 110 after the delay time passes after acquisition of the captured image of the certain frame.

Figure 2:
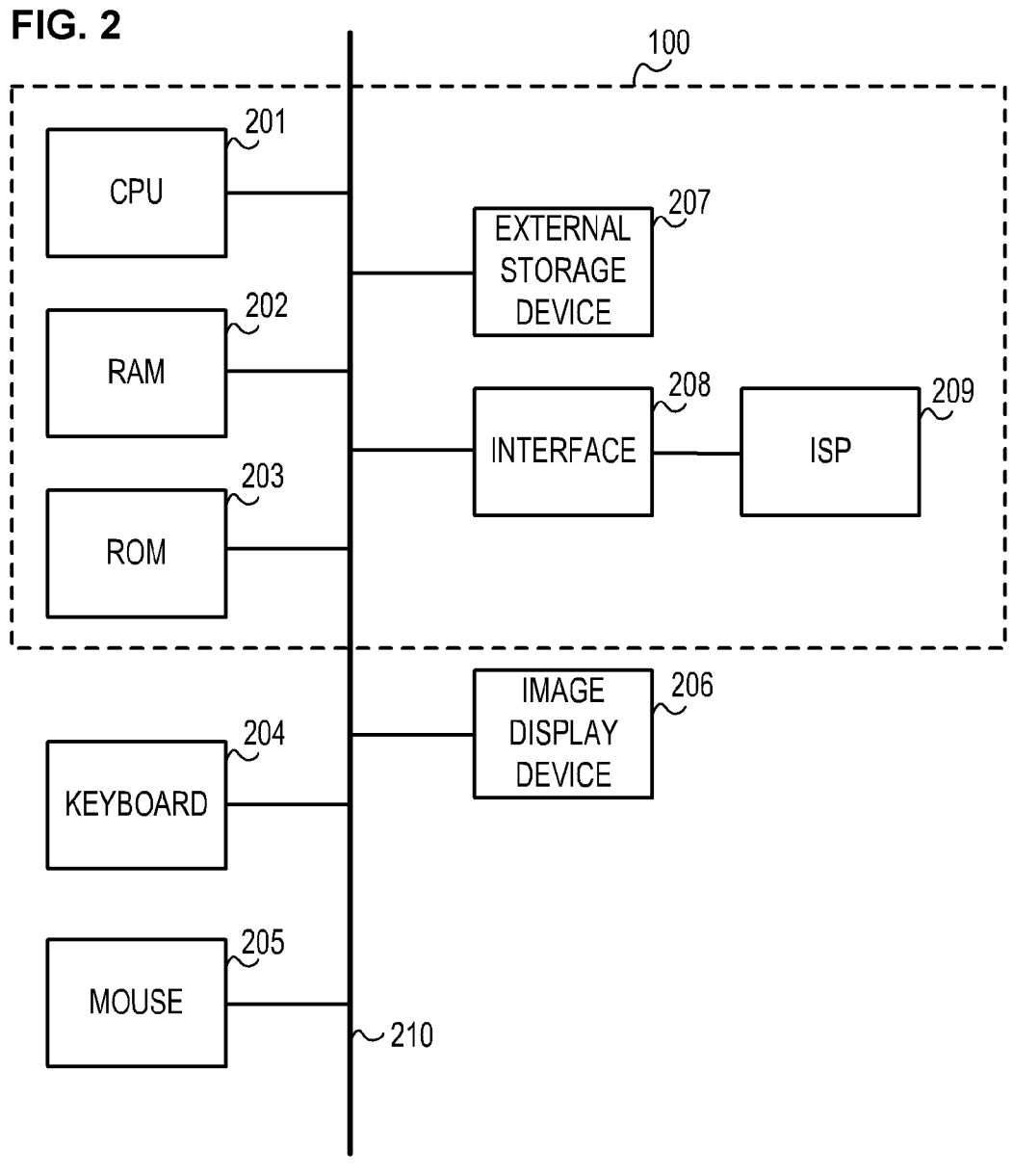
FIG. 2 is a hardware configuration diagram of an image processing device according to embodiment 1.

FIG. 2 is a block diagram illustrating a hardware configuration example of the image processing device 100 in FIG. 1. The image processing device 100 includes a CPU 201, a RAM 202, a ROM 203, the external storage device 207, an interface 208, and an ISP 209. A bus 210 connects these components. The image processing device 100 connects a keyboard 204, a mouse 205, and an image display device 206.

The CPU 201 controls the overall image processing device 100 using programs and data stored in the RAM 202 or the ROM 203. The RAM 202 (Random Access Memory) includes an area for temporarily storing programs and data loaded from the external storage device 207. Furthermore, the RAM 202 includes an area for temporarily storing data (data to be transmitted to an outside via the interface 208). Furthermore, the RAM 202 also includes a working area used by the CPU 201 to execute each processing. That is, the RAM 202 can provide various areas as appropriate.

The ROM 203 (Read Only Memory) stores setting data, a boot program, and the like of the image processing device 100 (computer). The keyboard 204 and the mouse 205 are examples of operation input devices (operation members). A user can input various instructions to the CPU 201 by operating the keyboard 204 and the mouse 205.

The image display device 206 is a liquid crystal panel or an organic EL panel. The image display device 206 can display a processing result of the CPU 201 as images, letters, or the like. The image display device 206 may be the display unit 112.

The external storage device 207 is a storage device such as a hard disk drive or a Solid State Drive (SSD) (a storage device which stores large-volume information). The external storage device 207 stores an Operating System (OS), and programs and data for causing the CPU 201 to execute each processing. These programs include programs for implementing the processing in the position and posture estimation unit 104, the CG generation unit 105, the CG synthesization unit 106, and the like. Furthermore, this data includes information of MR experience environment, and data described as known information in the above description.

The programs and the data stored in the external storage device 207 are loaded to the RAM 202 as appropriate under control of the CPU 201. The CPU 201 implements the processing of each component by executing processing using these loaded programs and data.

The interface 208 includes a digital input/output port (such as a USB), an Ethernet port for sending an output to the image display device 206, a PCI slot for connecting an extension board with the ISP 209 mounted thereon, or the like. The data received via the interface 208 is output to the RAM 202 and the external storage device 207.

The ISP 209 is an image signal processor which executes image processing in a dedicated manner. The ISP 209 is connected to the interface 208. The processing of the parameter acquisition unit 101, the image processing unit 102, and the like is implemented by the ISP 209.

Figures 3A, 3B:
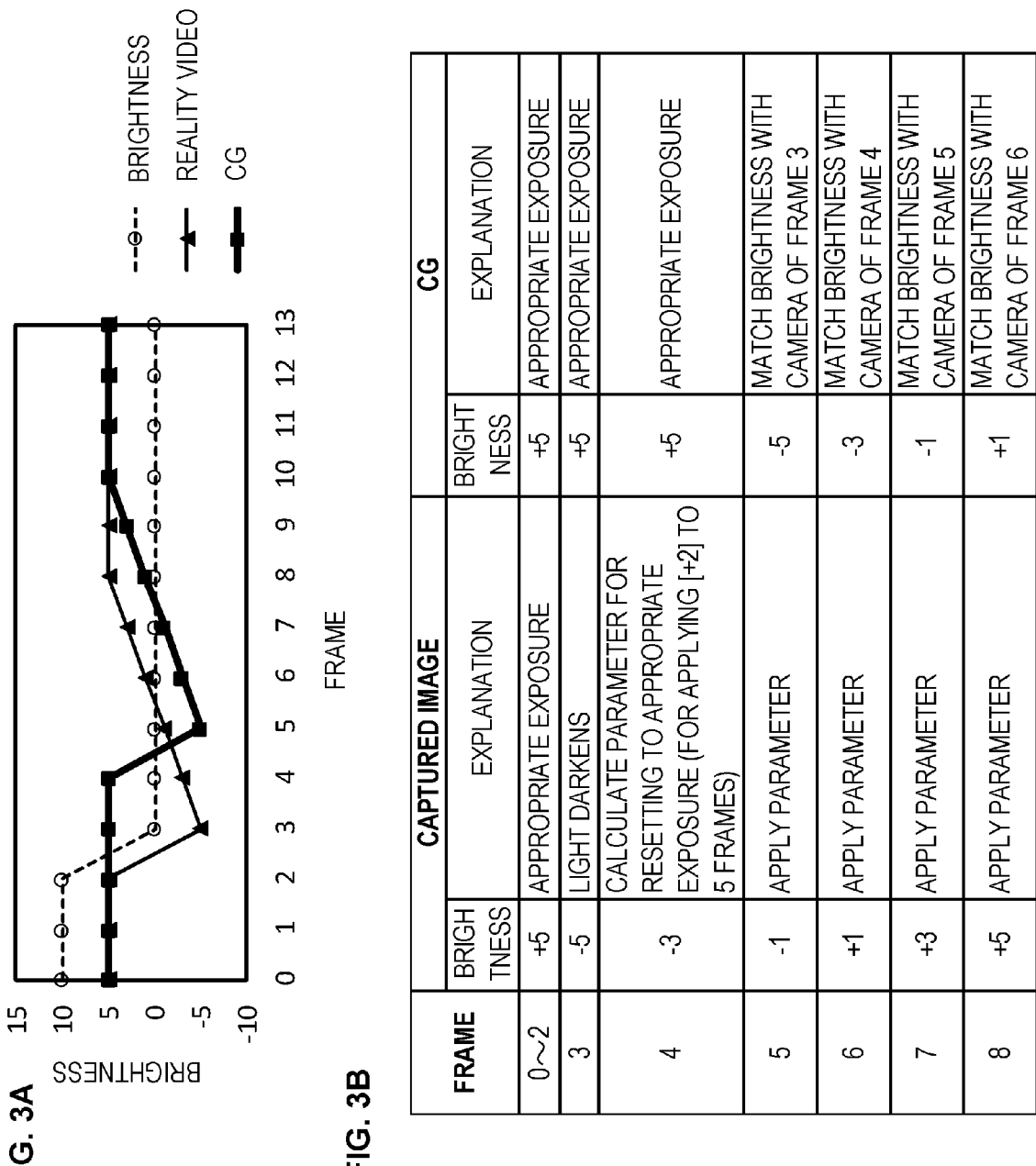
FIGS. 3A and 3B are views for describing control of brightness according to a comparative example.
Figure 7:
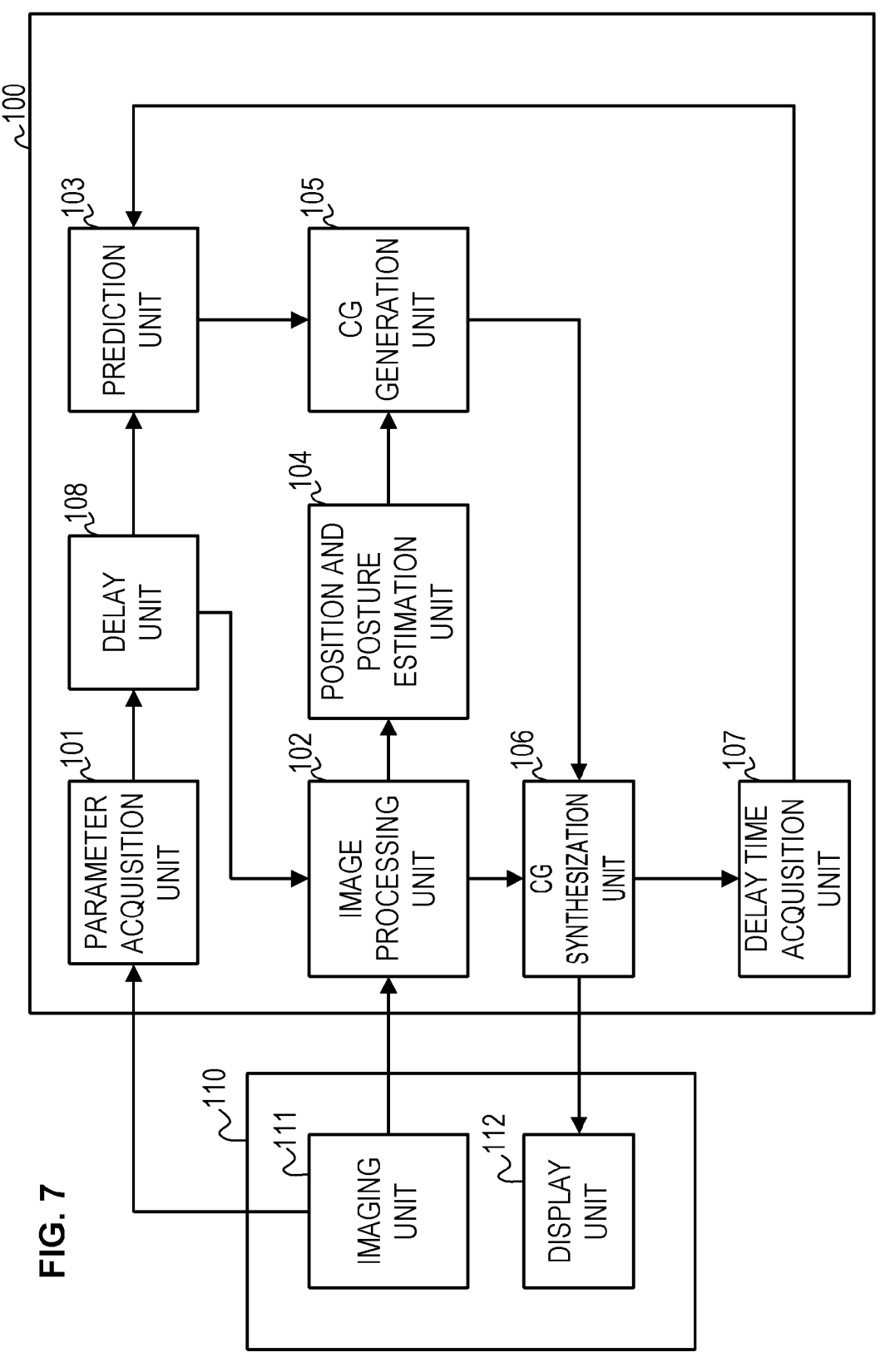
FIG. 7 is a hardware configuration diagram of an image processing device according to embodiment 2.

FIG. 3A is a graph for describing a change of brightness (property) in a case where the image processing device 100 does not include the prediction unit 103 (a case where the image processing parameter is not predicted; a case according to a comparative example). In FIG. 3A, the horizontal axis indicates a frame, and the vertical axis indicates brightness. Note that CG to be synthesized with a captured image of a frame N will be referred to as "CG of the frame N".

Data 301 indicates a change of brightness of a light in the reality space. Data 302 indicates a change of brightness of a captured image (reality video). Data 303 indicates a change of brightness of CG. Note that CG processing (display) timing is delayed by two frames from a captured image processing timing.

As illustrated in FIG. 3B, the brightness of the light in the reality space does not change until a frame 2, and both of the captured image and the CG keep appropriate brightness. Although, when the brightness of the light in the reality space suddenly darkens in a frame 3, a captured image darkens following darkening of the brightness, there is the delay time, and the CG keep the brightness. Between the frame 3 and a frame 4, the parameter acquisition unit 101 calculates the image processing parameter for resetting the brightness of the captured image to brightness of appropriate exposure. Here, a case will be studied where the image processing parameter (the image processing parameter for brightening an image by +2) for resetting the brightness of the captured image to the brightness of appropriate exposure over five frames to moderately change the brightness of the captured image. The captured image has applied thereto the image processing parameter (the image processing parameter for brightening the image by +2) from the frame 4 to a frame 8, and then is reset to the brightness of appropriate exposure. On the other hand, since the CG processing timing is delayed by the two frames compared to the captured image, the change of the brightness in the frame 3 applied to the captured image is applied to the CG in a frame 5. As a result, the brightness of the captured image and the brightness of the CG become different from the frame 3 to a frame 10, and therefore a synthesized image which gives a sense of strangeness to the user is generated.

Figure 4A:
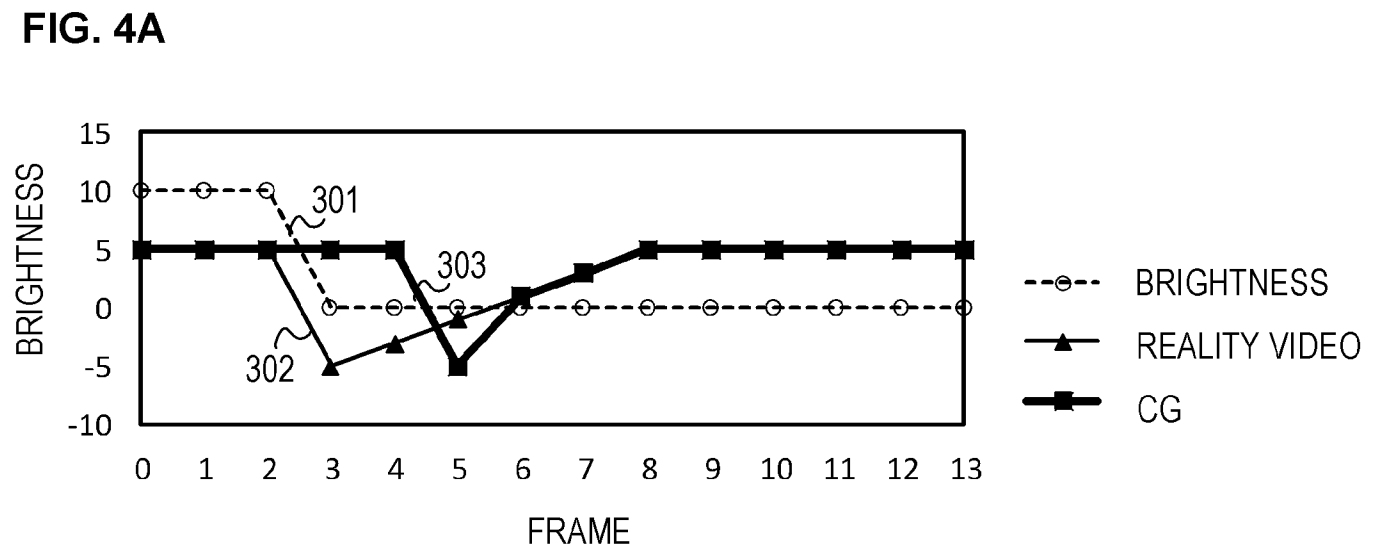

On the other hand, FIG. 4A is a graph for describing control of brightness (control of brightness in a case where the image processing device 100 includes the prediction unit 103) according to embodiment 1. A change of brightness illustrated in FIG. 4A is the same as the change of the brightness illustrated in FIG. 3A until a frame 5.

As illustrated in FIG. 4B, the brightness of the CG in a frame 6 is predicted based on the brightness of the captured image in the frame 4 and the image processing parameter calculated by the parameter acquisition unit 101 such that the brightness of the CG becomes the same as brightness of the captured image in the frame 6. Here, the brightness of the captured image in the frame 4 is –3. Since the CG processing timing is delayed by two frames compared to the captured image processing timing, the brightness of the captured image in the frame 6 after the two frames is predicted as +1. Furthermore, the brightness of the captured image is changed by +4 over two frames in the future, and therefore the future change (image processing parameter=+2) of the brightness of CG is recorded (stacked). As described above, the change of the brightness is predicted as the image processing parameter, so that it is possible to match the brightness of the captured image and the CG from the frame 6 to the frame 10.

A flowchart in FIG. 5A illustrates processing of generating a mixed reality video (synthesized image) according to embodiment 1. Note that the processing in the flowchart in FIG. 5A may be performed at all times during a period in which a reality video is captured, or may be executed only during a predetermined period (during a predetermined number of frames) when brightness of the reality space changes during the above period.

In step S501, the imaging unit 111 acquires a captured image of the frame N (an N-th image of the reality video).

In step S502, the parameter acquisition unit 101 calculates the image processing parameter to be applied to the captured image of the frame N based on the captured image of the frame N.

In step S503, the parameter acquisition unit 101 gives to the prediction unit 103 an instruction for starting rendering CG based on the captured image of the frame N. When this instruction is given, the processing illustrated in the flowchart in FIG. 5B is performed based on the captured image of the frame N acquired in step S501.

In step S504, the image processing unit 102 applies the image processing parameter to the captured image of the frame N. In a case where, for example, current settings of brightness of the captured image is –1 and the image processing parameter is a parameter for brightening an image by +2, the image processing unit 102 adjusts the brightness of the captured image such that the brightness of the captured images is a sum(=+1) of these values.

In step S505, the CG synthesization unit 106 synthesizes the captured image of the frame N and the CG whose rendering is finished at a current point of time. Here, there is a difference of two frames between a captured image processing timing and a CG processing timing. Hence, "the captured image of the frame N" and "CG of the frame N which has been rendered based on a captured image of a frame N–2" are synthesized.

In step S506, the delay time acquisition unit 107 measures (acquires) a delay time (a time corresponding to the two frames).

In step S507, the display unit 112 displays an image (synthesized image) obtained by synthesizing the captured image of the frame N and the CG of the frame N in step S505.

In step S508, the imaging unit 111 determines whether or not to continue imaging. The processing returns to step S501 in a case where it is determined to continue imaging, and imaging is performed to acquire a captured image of a next frame (frame N+1). In a case where it is determined to not continue imaging, the processing in this flowchart is finished.

A flowchart in FIG. 5B illustrates processing of rendering the CG based on the captured image of the frame N (i.e., processing of generating CG to be synthesized with the captured image). The processing in the flowchart in FIG. 5B is started independently from the processing in the flowchart in FIG. 5A every time the instruction in step S503 is given.

In step S511, the prediction unit 103 predicts (estimates) an image processing parameter to be applied to CG of a frame N+2 after the delay time from the frame N. The prediction unit 103 predicts (estimates) the image processing parameter based on the image processing parameter calculated in step S502 (the image processing parameter to be applied to the captured image of the frame N), the delay time, and brightness of the captured image of the frame N.

In step S512, the position and posture estimation unit 104 estimates the position and posture of the imaging unit 111 at a time of capturing of the captured image of the frame N+2 based on the captured image of the frame N and the delay time.

In step S513, the CG generation unit 105 renders CG of the frame N+2 (generates the CG) based on the position and posture of the imaging unit 111. Note that the CG generation unit 105 applies the image processing parameter predicted in step S511 to the CG of the frame N+2 when performing rendering.

Figure 6:
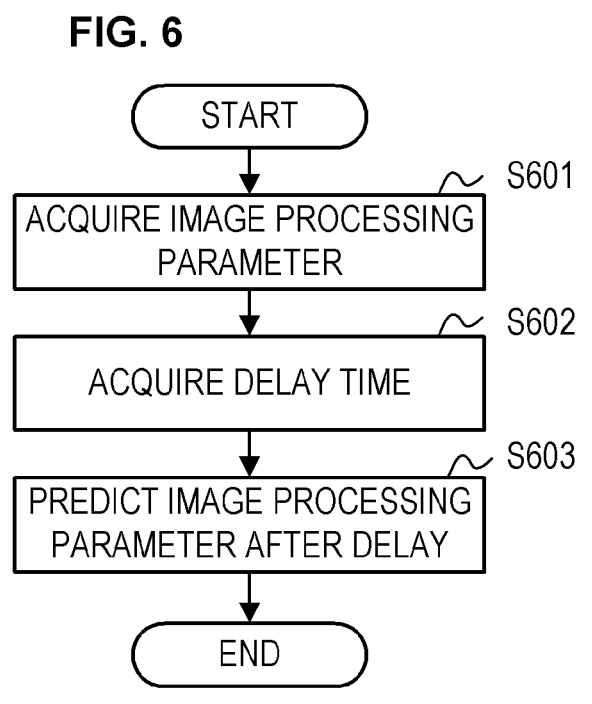

FIG. 6 is a flowchart illustrating the processing (image processing parameter prediction processing) in step S511 in more detail.

In step S601, the prediction unit 103 acquires the image processing parameter (the image processing parameter calculated based on the captured image of the frame N in step S502).

In step S602, the prediction unit 103 acquires a delay time lastly acquired by the delay time acquisition unit 107.

In step S603, the prediction unit 103 predicts an image processing parameter based on the brightness of the captured image of the frame N, the image processing parameter acquired in step S601, and the delay time acquired in step S602.

According to embodiment 1, the image processing parameter for making brightness of CG the same as brightness (property) of the captured image used for synthesization is applied to the CG, so that it is possible to match the brightness of the captured image and the CG in a synthesized image. Consequently, it is possible to reduce a sense of strangeness given to the user who looks at the synthesized image.

Embodiment 2

Embodiment 1 has described the image processing device which predicts an image processing parameter of CG using the prediction unit. In embodiment 2, as illustrated in FIG.

7, the image processing device 100 includes a delay unit 108 in addition to each component of the image processing device according to embodiment 1.

The delay unit 108 intentionally delays application of an image processing parameter to a captured image by a delay time acquired by the delay time acquisition unit 107.

Figure 8A:
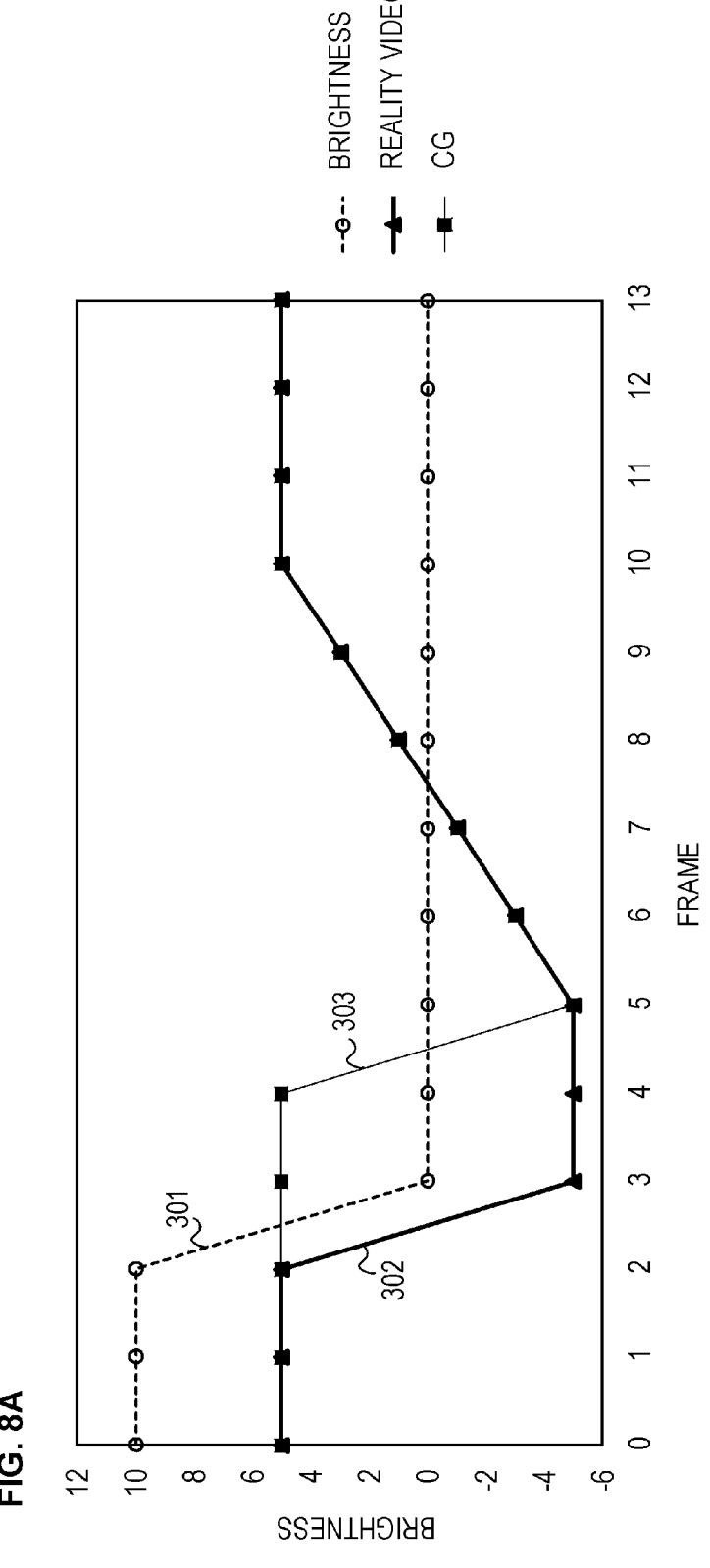
FIG. 8A is a view for describing control of brightness according to embodiment 2.

FIG. 8A is a graph for describing control of brightness according to embodiment 2. Similar to FIG. 4A, in FIG. 8A, the horizontal axis indicates a frame, and the vertical axis indicates brightness. The data 301 indicates a change of brightness of a reality space, and the data 302 indicates a change of brightness of the captured image. The data 303 indicates a change of brightness of the CG.

Note that, in embodiment 2, too, there is delay corresponding to two frames between a CG processing timing and a captured image processing timing. In FIG. 8A, the delay unit 108 does not apply the calculated image processing parameter to the captured image in the frame 4 and the frame 5, and brightness in the frame 3 continues being kept as is. As a result, the captured image and CG image processing timings match in the frame 5, so that the brightness of the captured image and the CG also match. Subsequently, from the frame 6 to the frame 10 (between five frames), brightness of the captured image changes by +2 at a time according to the image processing parameter for resetting the brightness of the captured image to appropriate exposure calculated in the frame 4. On the other hand, as for the CG, a future change of the brightness of the captured image is predicted from the image processing parameter calculated in the frame 4. As illustrated in FIG. 8B, since it is known that the brightness of the captured image changes by +2 at a time in the future between the five frames, the image processing parameter applied to the captured image is also applied to the CG. Consequently, by providing the delay unit 108 to the image processing device 100, it is possible to match the brightness of the captured image and the CG from the frame 5 to the frame 10. Consequently, it is possible to extend a time during which the brightness of the captured image and the CG is matched compared to embodiment 1.

Figure 9:
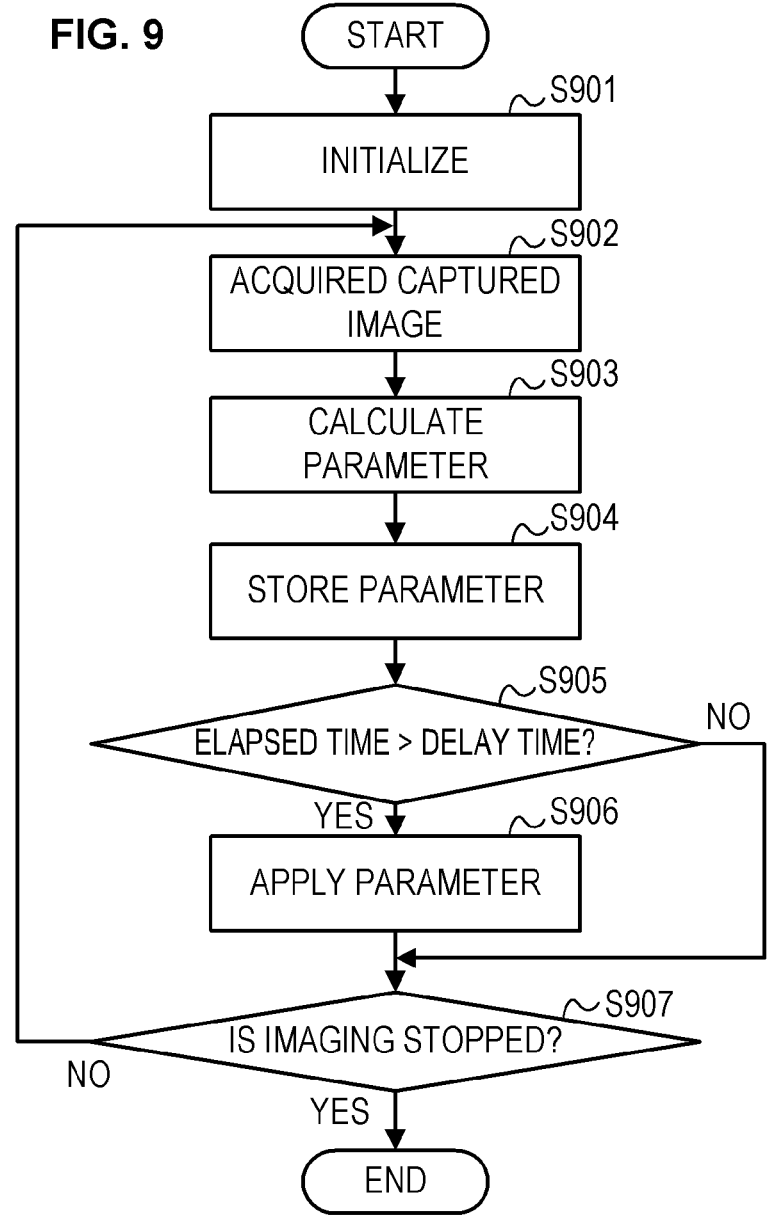
FIG. 9 is a flowchart illustrating image processing of a captured image according to embodiment 2.

A flowchart illustrated in FIG. 9 is a flowchart illustrating image processing of the captured image (reality video) according to embodiment 2. That is, processing such as CG rendering, synthesization, and display of a synthesized image will not be described in detail below unlike the description made with reference to FIG. 5. As for CG rendering, synthesization, display of a synthesized image, and the like, the processing described with reference to FIGS. 8A and 8B is performed.

In step S901, the image processing unit 102 initializes the image processing parameter. Furthermore, the image processing unit 102 sets N indicating a frame number to one.

In step S902, the imaging unit 111 acquires a captured image of the frame N by performing imaging.

In step S903, the parameter acquisition unit 101 calculates an image processing parameter based on the captured image of the frame N.

In step S904, the delay unit 108 stacks once the image processing parameter calculated in step S903 without immediately applying the image processing parameter.

In step S905, the delay unit 108 compares an elapsed time from start of capturing of the captured image of the frame N (acquisition of the captured image), and the delay time acquired by the delay time acquisition unit 107. In a case where the elapsed time reaches the delay time (i.e., a case where the delay time passes from acquisition of the captured image of the frame N), the processing proceeds to step S906.

In a case where the elapsed time does not reach the delay time, the processing proceeds to step S907.

In step S906, the delay unit 108 takes out the image processing parameter based on the captured image in the frame N (i.e., an oldest stacked image processing parameter), and sends this image processing parameter to the image processing unit 102. The image processing unit 102 applies the image processing parameter to a captured image of the frame N+2 after the delay time after the frame N.

Then, the CG synthesization unit 106 synthesizes the captured image of the frame N+2 to which the image processing parameter based on the captured image of the frame N has been applied, and CG of the frame N+2. Here, the CG of the frame N+2 is generated by the CG generation unit 105 by applying the image processing parameter (the image processing parameter acquired in step S903) based on the captured image of the frame N. Note that, similar to embodiment 1, the position and posture of the imaging unit 111 at the time of capturing of the captured image of the frame N+2 is estimated, and the CG of the frame N+2 is generated based on the position and posture.

In step S907, the imaging unit 111 determines whether or not to continue imaging. In a case where it is determined to continue imaging, the processing returns to step S902, and processing from capturing of the captured image of the next frame N+1 is repeated. In a case where it is determined to stop imaging, the processing in this flowchart is finished.

According to embodiment 2, it is possible to perform control such that the same image processing parameter is applied to CG and a captured image included in a synthesized image. Consequently, it is possible to match the property of the CG and the captured image included in the synthesized image, so that it is possible to generate the synthesized image which gives a less sense of strangeness to the user.

Embodiment 3

Embodiment 1 and embodiment 2 have described the cases where the image processing parameter is an exposure correction value (brightness) for correcting a gain, a shutter speed, and the like. The present embodiment will describe a case where an image processing parameter is a color temperature associated with a white balance correction value such as R/G or B/G.

To correct a color temperature of a captured image to match correction of the white balance of the imaging unit 111, the parameter acquisition unit 101 evaluates the color temperature of the captured image captured by the imaging unit 111. In a case where the color temperature of the captured image is low (e.g., 3000 K and reddish) with respect to a set appropriate value (e.g., 5000 K), the parameter acquisition unit 101 calculates an image processing parameter for increasing the color temperature of the captured image (making the captured image bluish). That is, the parameter acquisition unit 101 calculates a corresponding image processing parameter for decreasing a value of R/G or increasing a value of B/G. On the other hand, in a case where the color temperature of the captured image is high (e.g., 7000 K and bluish), the parameter acquisition unit 101 calculates an image processing parameter for decreasing the color temperature (making the captured image reddish). That is, the parameter acquisition unit 101 calculates a corresponding image processing parameter for decreasing a value of B/G or increasing a value of R/G.

The calculated image processing parameter is applied to the captured image by the image processing unit 102. When a result of this application is input again to the parameter acquisition unit 101, and calculation is repeated, it is possible to appropriately control the color temperature of the captured image at all times.

Figure 10A:
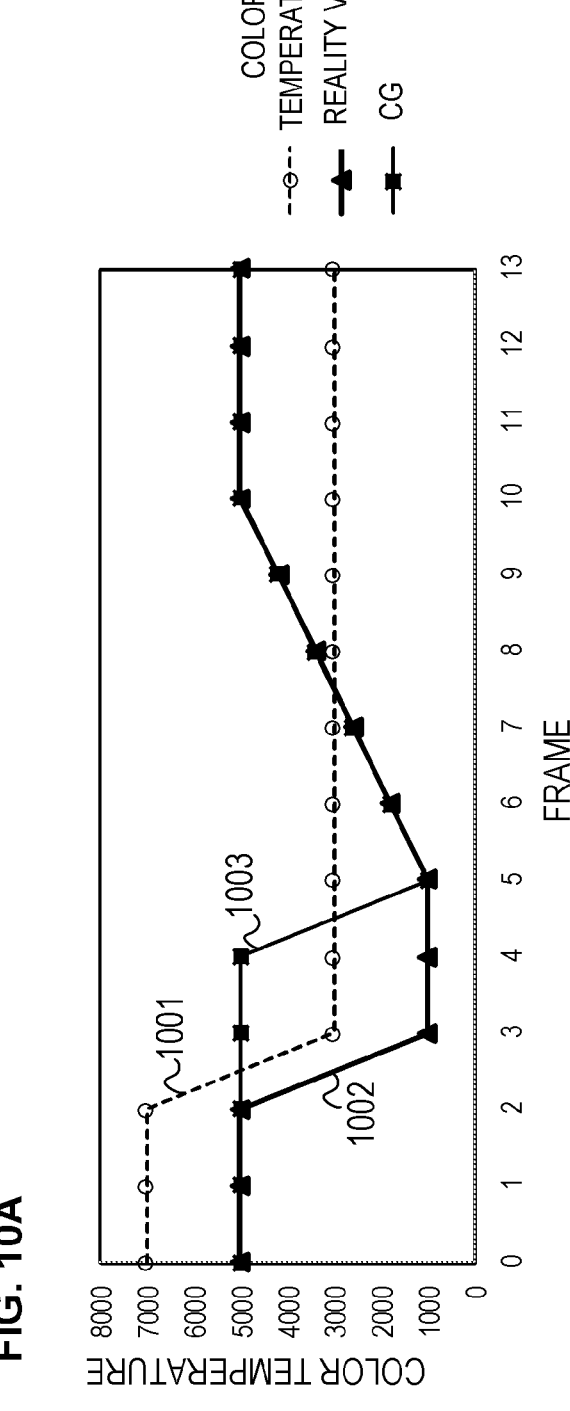
FIG. 10A is a view for describing control of a color temperature according to embodiment 3.

FIG. 10A is a graph for describing a case where the image processing parameter is the color temperature (a parameter associated with a correction value of a white balance) in the graph according to embodiment 2 (the graph illustrated in FIG. 8A). In FIG. 10A, the horizontal axis indicates the number of frames, and the vertical axis indicates the color temperature. Data 1001 indicates a color temperature of a light in a reality space, and data 1002 indicates a color temperature of a captured image (reality video). Furthermore, data 1003 indicates a color temperature of CG. Note that the present embodiment assumes that the CG are delayed by two frames from the captured image.

Until the frame 2, the color temperature of the light of the captured image does not change, and both of the captured image and the CG keep the color temperatures of the appropriate white balance. Although, when the color temperature of the light in the reality space rapidly changes toward a low color temperature side (reddish) in the frame 3 as illustrated in FIG. 10B, the captured image also changes toward the low color temperature side (reddish) following the change, the CG keep the color temperature of the appropriate white balance. In the frame 4 and the frame 5, the delay unit 108 does not apply the calculated image processing parameter to the captured image. As a result, in the frame 5, captured image and CG image processing timings are matched, so that the color temperatures of the captured image and the CG also match. Subsequently, the color temperature changes by +800 K (bluish) during five frames from the frame 6 to the frame 10 according to a parameter for resetting the captured image to the color temperature of the appropriate white balance calculated in the frame 4. On the other hand, a future change of the color temperature of a captured image is predicted for the CG from the image processing parameter calculated in the frame 4. It is known that the color temperature of the captured image changes by +800 K (bluish) during the five frames in the future. Hence, the image processing parameter is stacked such that the same image processing parameter is also applied to the CG. Consequently, it is possible to match the color temperatures (property) of the captured image and the CG from the frame 5 to the frame 10.

According to embodiments 1 to 3, it is possible to further reduce the sense of strangeness given to the user by an image obtained by synthesizing an image and CG. Note that embodiments 1 to 3 have described the HMD (video see-through type HMD) which displays a synthesized image obtained by synthesizing a captured image and CG. However, embodiments 1 to 3 are applicable to the HMD (optical see-through type HMD) which makes it possible to see a reality space through the display unit. Consequently, the HMD may display only the CG whose property has been adjusted instead of displaying the captured image.

The present invention has been described in detail above based on the suitable embodiments. However, the present invention is not limited to these specific embodiments, and various embodiments which do not deviate from the gist of the present invention are also covered by the present invention. Part of the above-described embodiments may be combined as appropriate.

Furthermore, "in a case where A is B or more, the processing proceeds to step S1 and, in a case where A is smaller (lower) than B, the processing proceeds to step S2" in the above description may be read as "in a case where A is larger (higher) than B, the processing proceeds to step S1 and, in a case where A is B or less, the processing proceeds to step S2". By contrast with this, "in a case where A is larger (higher) than B, the processing proceeds to step S1 and, in a case where A is B or less, the processing proceeds to step S2" maybe read as "in a case where A is larger (higher) than B, the processing proceeds to step S1 and, in a case where A is smaller (lower) than B, the processing proceeds to step S2". Hence, as long as contradictions do not arise, "A or more" may be read as "larger (higher; longer; greater) than A", and "A or less" maybe read as "smaller (lower; shorter; less) than A". Furthermore, "larger (higher; longer; greater) than A" maybe read as "A or more", and "smaller (lower; shorter; less) than A" maybe read as "A or less".

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-009247, filed on Jan. 25, 2023, which is hereby incorporated by reference herein in its entirety.

What is claimed is:

1. An image processing device comprising:
a processor; and
a memory storing a program which, when executed by the processor, causes the image processing device to:
(A) execute acquisition processing of (1) acquiring a first parameter for adjusting a property of a captured image of a first frame upon acquiring the captured image of the first frame captured by an imaging device, and (2) acquiring a second parameter for adjusting a property of a captured image of a second frame upon acquiring the captured image of the second frame which is captured after a delay time required for generating a virtual object has elapsed since the captured image of the first frame was acquired;

(B) execute adjustment processing of adjusting the property of the captured image of the second frame based on the second parameter;

(C) execute prediction processing of predicting a third parameter for adjusting a property of the virtual object so as to match the property of the captured image of the second frame adjusted in the adjustment processing and the property of the virtual object based on (1) the delay time and (2) the first parameter; and (D) execute generation processing of generating the virtual object whose property is adjusted based on the third parameter.

2. The image processing device according to claim 1, wherein the program, when executed by the processor, further causes the image processing device to execute synthesization processing of synthesizing (1) the virtual object generated in the generation processing and (2) the captured image of the second frame adjusted in the adjustment processing.

3. The image processing device according to claim 2, wherein the delay time is a time taken until the captured image of the second frame and the virtual object are synthesized after synthesization is performed using an image of the first frame.

4. The image processing device according to claim 2, wherein the delay time is a difference between a time stamp indicating an acquisition time of the first parameter and a time stamp indicating a synthesization time at which the virtual object is synthesized with the captured image of the second frame.

5. The image processing device according to claim 1, wherein the program, when executed by the processor, further causes the image processing device to execute estimation processing of estimating a position and posture of the imaging device in a case where the captured image of the second frame is captured, and wherein in the generation processing, the virtual object is generated based on (1) the position and posture estimated in the estimation processing and (2) the third parameter.

6. The image processing device according to claim 5, wherein in the estimation processing, the position and posture of the imaging device are estimated based on (1) the captured image of the first frame and (2) the delay time.

7. The image processing device according to claim 1, wherein the property is brightness.

8. The image processing device according to claim 1, wherein the property is a color temperature.

9. The image processing device according to claim 1, wherein the third parameter is an image processing parameter applied to the virtual object, and includes a parameter concerning at least one of brightness, white balance, and color temperature.

10. An image processing device comprising:
a processor; and
a memory storing a program which, when executed by the processor, causes the image processing device to:
(A) execute acquisition processing of acquiring an image processing parameter based on a captured image of a first frame captured by an imaging device;
(B) execute generation processing of generating a virtual object by adjusting a property of the virtual object based on the image processing parameter; and (C) execute adjustment processing of adjusting a property of a captured image of a second frame which is captured after a delay time required for generating the virtual object has elapsed since the captured image the first frame was acquired, based on the image processing parameter.

11. The image processing device according to claim 10, wherein the program, when executed by the processor, further causes the image processing device to execute synthesization processing of synthesizing (1) the virtual object generated in the generation processing and (2) the captured image of the second frame adjusted in the adjustment processing.

12. The image processing device according to claim 10, wherein, in a case where a delay time which is a difference of a time between the first frame and the second frame passes after the captured image of the first frame is acquired, the property of the captured image of the second frame is adjusted in the adjustment processing based on the image processing parameter.

13. The image processing device according to claim 12, wherein the delay time is a time taken until the captured image of the second frame and the virtual object are synthesized after synthesization is performed using the captured image of the first frame.

14. The image processing device according to claim 10, wherein the program, when executed by the processor, further causes the image processing device to execute estimation processing of estimating a position and posture of the imaging device in a case where the captured image of the second frame is captured, and wherein in the generation processing, the virtual object is generated based on (1) the position and posture estimated in the estimation processing and (2) the image processing parameter.

15. An image processing method comprising:
acquiring a first parameter for adjusting a property of a captured image of a first frame upon acquiring the captured image of the first frame captured by an imaging device;
acquiring a second parameter for adjusting a property of a captured image of a second frame upon acquiring the captured image of the second frame which is captured after a delay time required for generating a virtual object has elapsed since the captured image of the first frame was acquired;
adjusting the property of the captured image of the second frame based on the second parameter;
predicting a third parameter for adjusting a property of the virtual object so as to match the property of the captured image of the second frame adjusted by the adjusting and the property of the virtual object based on (1) the delay time and (2) the first parameter; and
generating the virtual object whose property is adjusted based on the third parameter.

16. A non-transitory computer-readable medium that stores a program, wherein the program causes a computer to execute the image processing method according to claim 15.

17. An image processing method comprising:
acquiring an image processing parameter based on a captured image of a first frame captured by an imaging device;
generating a virtual object by adjusting a property of the virtual object based on the image processing parameter; and
adjusting a property of a captured image of a second frame which is captured after a delay time required for generating the virtual object has elapsed since the captured image of the first frame was acquired, based on the image processing parameter.

18. A non-transitory computer-readable medium that stores a program, wherein the program causes a computer to execute the image processing method according to claim 17.

* * * * *